United States Patent
Frank et al.

(10) Patent No.: US 11,909,821 B2
(45) Date of Patent: Feb. 20, 2024

(54) METHOD FOR PROCESSING APPLICATION PROGRAMS IN A DISTRIBUTED AUTOMATION SYSTEM

(71) Applicant: Phoenix Contact GmbH & Co. KG, Blomberg (DE)

(72) Inventors: Tobias Frank, Lemgo (DE); Harry Koop, Lago (DE); Julian Bartel, Lemgo (DE)

(73) Assignee: PHOENIX CONTACT GMBH & CO. KG

( * ) Notice: Subject to any disclaimer, the term of this patent is extended or adjusted under 35 U.S.C. 154(b) by 299 days.

(21) Appl. No.: 17/293,726

(22) PCT Filed: Nov. 7, 2019

(86) PCT No.: PCT/EP2019/080475
§ 371 (c)(1),
(2) Date: May 13, 2021

(87) PCT Pub. No.: WO2020/104198
PCT Pub. Date: May 28, 2020

(65) Prior Publication Data
US 2022/0006863 A1    Jan. 6, 2022

(30) Foreign Application Priority Data
Nov. 21, 2018   (DE) ..................... 10 2018 129 354.2

(51) Int. Cl.
*H04L 67/12* (2022.01)
*H04L 9/32* (2006.01)
(Continued)

(52) U.S. Cl.
CPC .............. *H04L 67/12* (2013.01); *G06F 21/64* (2013.01); *H04L 9/3247* (2013.01);
(Continued)

(58) Field of Classification Search
None
See application file for complete search history.

(56) References Cited

U.S. PATENT DOCUMENTS 8,624,704 B2    1/2014  Bornstein
9,021,443 B1    4/2015  Lachwani et al.
(Continued)

FOREIGN PATENT DOCUMENTS

CN          104572237 A      4/2015
DE    10 2015 209 108 A1    11/2016
(Continued)

OTHER PUBLICATIONS

International Preliminary Report on Patentability dated May 25, 2021 issued in connection with corresponding International Application No. PCT/EP2019/080475 (English language translation only) (8 pages total).

(Continued)

*Primary Examiner* — Lashonda Jacobs-Burton
(74) *Attorney, Agent, or Firm* — John Maldjian, Esq.; Stevens & Lee PC

(57) ABSTRACT

Embodiments of the invention relate to the processing of a safety-related user program for a safety control system. The generation of the machine code for the safety-related control takes place on a cloud computer. The data required for generating the machine code such as the source code data of the user program, are secured with a unique signature and transmitted to the cloud computer. The machine code is generated on the cloud computer from the transmitted data. A new signature is generated via the resultant data and the signature from the preceding step. The entire safety life cycle is also covered, since each step in the life cycle is automatically documented and may be clearly tracked at any time, and corruptions of a step may be detected.

21 Claims, 3 Drawing Sheets

(51) Int. Cl.
  *H04L 67/10* (2022.01)
  *G06F 21/64* (2013.01)
  *H04L 67/00* (2022.01)

(52) U.S. Cl.
  CPC ............ *H04L 9/3263* (2013.01); *H04L 67/10* (2013.01); *H04L 67/34* (2013.01)

(56) References Cited

U.S. PATENT DOCUMENTS

| | | |
|---|---|---|
| 9,219,611 B1 | 12/2015 | Naik |
| 10,025,287 B2 * | 7/2018 | Prosak .................. G06F 21/572 |
| 10,091,183 B2 | 10/2018 | Stumpf et al. |
| 2004/0027875 A1 * | 2/2004 | Dinges ............... G05B 19/0421 365/200 |
| 2005/0071022 A1 * | 3/2005 | Izzo ................... G05B 19/0428 700/79 |
| 2008/0267189 A1 | 10/2008 | Li |
| 2012/0078392 A1 * | 3/2012 | Woehrle .................... G05B 9/03 700/86 |
| 2012/0096428 A1 | 4/2012 | Moosmann et al. |
| 2017/0032117 A1 | 2/2017 | Koohgoli et al. |
| 2017/0078103 A1 | 3/2017 | Follis |
| 2017/0262278 A1 * | 9/2017 | Takuma .................... G06F 8/71 |
| 2017/0262298 A1 * | 9/2017 | Frank ........................ G06F 8/65 |
| 2018/0109387 A1 | 4/2018 | Vyas et al. |
| 2018/0189732 A1 | 7/2018 | Kozloski et al. |
| 2018/0227116 A1 * | 8/2018 | Chapman ................ G06F 21/64 |
| 2018/0329693 A1 | 11/2018 | Eksten et al. |
| 2021/0065919 A1 * | 3/2021 | Jetzfellner .......... H04L 12/2816 |
| 2022/0085982 A1 * | 3/2022 | Muneta .................... G06F 21/57 |
| 2022/0171359 A1 * | 6/2022 | Nagata ................. H04L 9/0825 |

FOREIGN PATENT DOCUMENTS

| | | |
|---|---|---|
| EP | 0 997 807 A2 | 5/2000 |
| EP | 2 363 770 B1 | 9/2011 |
| WO | 2018/144153 A1 | 8/2018 |

OTHER PUBLICATIONS

International Search Report dated Feb. 5, 2020 issued in connection with corresponding International Application No. PCT/EP2019/080475 with English language translation (7 pages total).

German Office Action dated Sep. 17, 2019, issued in connection with corresponding German Patent Application No. 10 2018 129 354.2.

Wikipedia article: Code Signing. Revision of Nov. 9, 2018. URL: https://en.wikipedia.org/w/index.php?title=Code_signing&oldid=867967038 (6 pages total).

Wikipedia article: Continuous Integration. Revision of Nov. 19, 2018. URL: https://en.wikipedia.org/w/index.php?title=Continuous_integration&oldid=869609412 (8 pages total).

Engblom, J. "Continuous Integration for embedded systems using simulation", embeddedworld2015 Exhibition & Conference 2015. (8 pages total).

Chinese Office Action and Search Report dated Apr. 29, 2023 issued in connection with corresponding Chinese Application No. 201980077063.8 with English language translation (10 pages total).

Qin, et al., "Self-owned APP signature protection scheme based on digital certificate)", Telecommunications Engineering Technology and Standardization, vol. 29 Issue 12 (2016) (12 pages total).

Lei Lingguang, et al., "Android: Studying the Implementation and Security of the Signature Authentication Mechanism in Android", Information Network Security, 08 (Aug. 10, 2012)—English Language abstract (3 pages total).

* cited by examiner

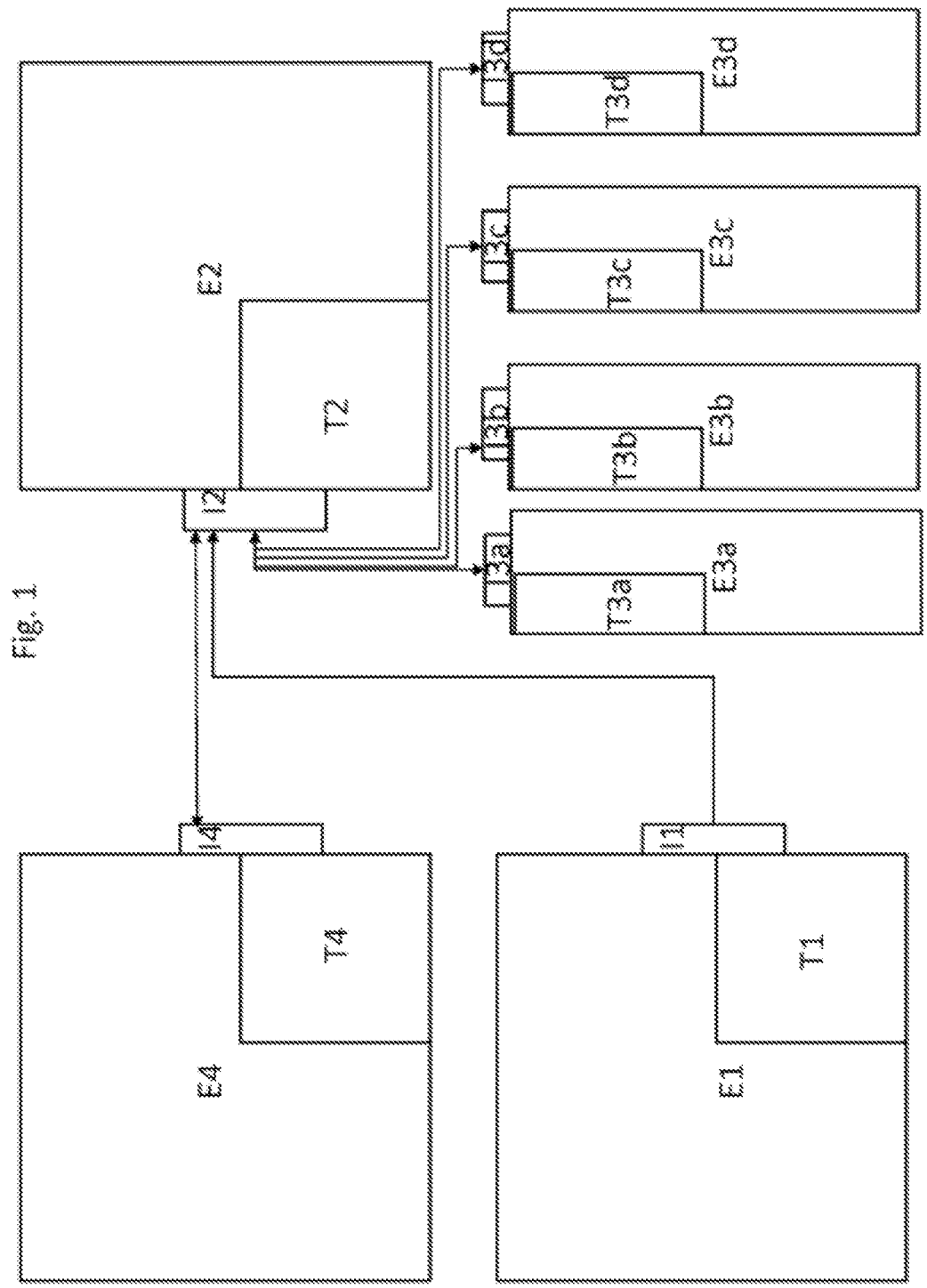

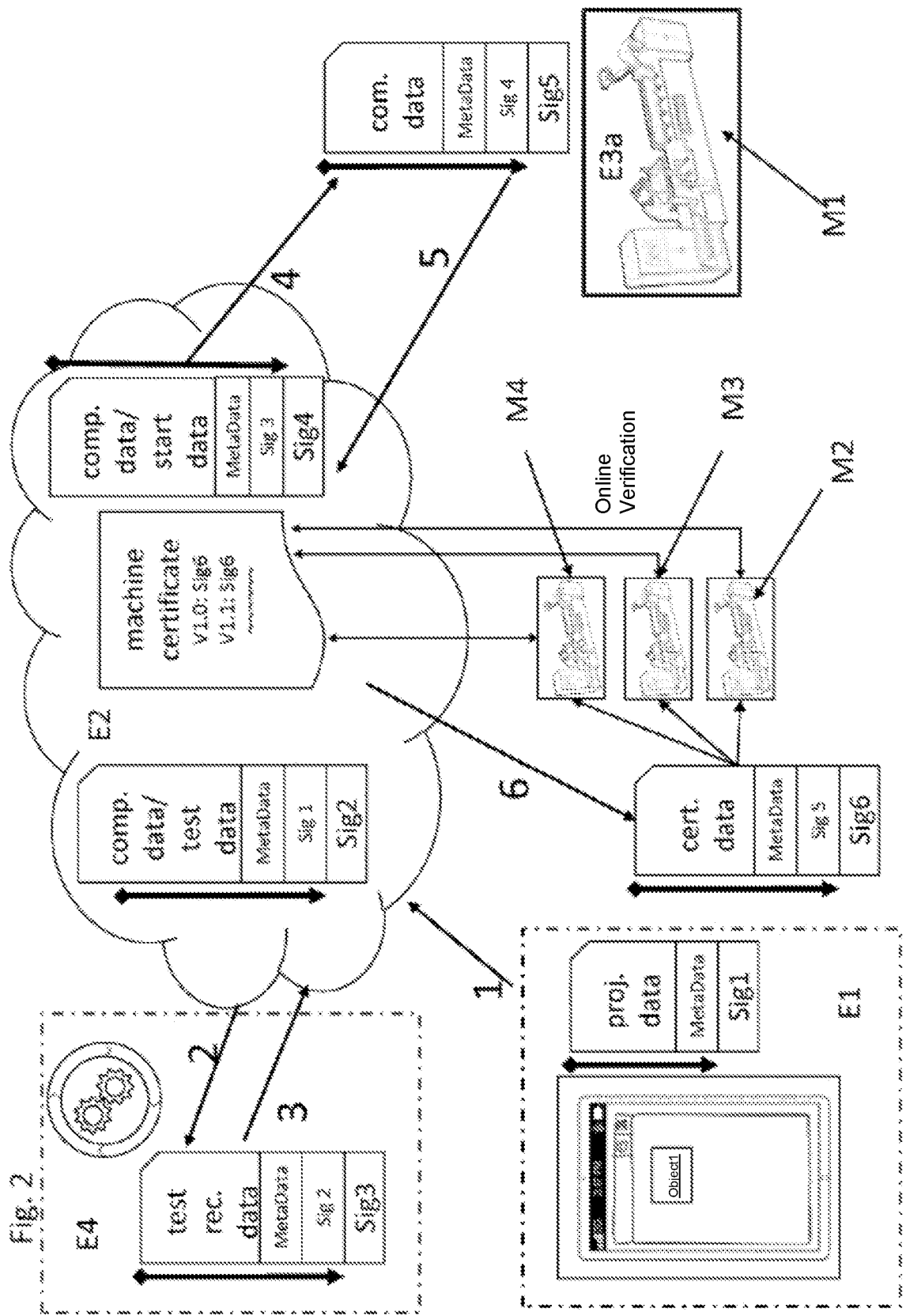

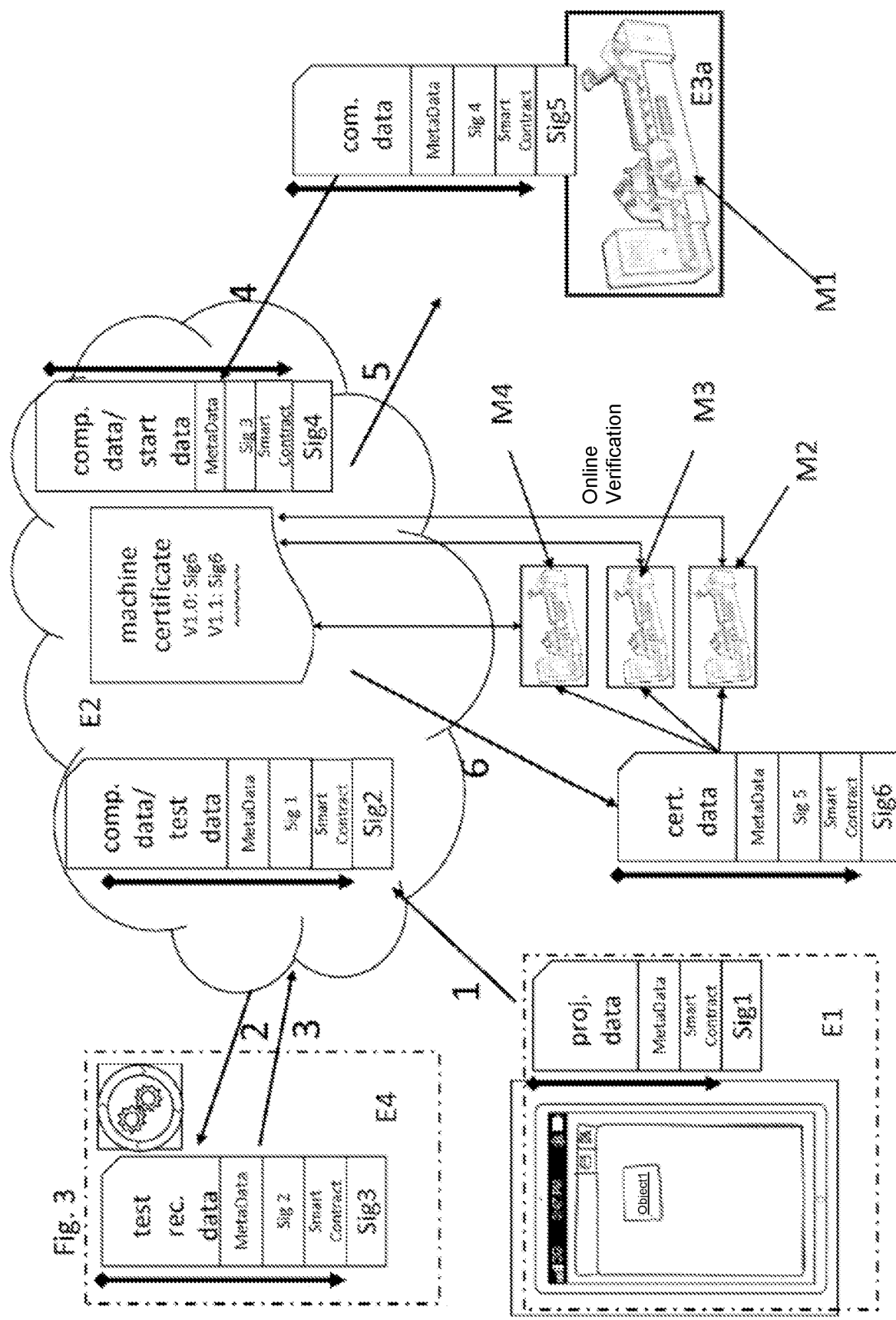

METHOD FOR PROCESSING APPLICATION PROGRAMS IN A DISTRIBUTED AUTOMATION SYSTEM

CROSS-REFERENCE TO RELATED APPLICATIONS

This application claims the benefit under 35 U.S.C. § 371 of International Application No. PCT/EP2019/080475 filed on Nov. 7, 2019, which in turn claims the benefit of German Application No. 10 2018 129 354.2 filed on Nov. 21, 2018, the entire content of each of which is hereby incorporated by reference in their entirety.

FIELD

Embodiments of the invention relate to a method for processing a safety-related user program for a safety control system, which is configured to control an automated device that contains at least one protection unit for carrying out at least one safety function. The user program specifies logical connections as a function of a respective state of the at least one safety function for the safety control system for controlling the machine via the safety control system, as well as an automation system for carrying out the method.

Applications for creating, starting up, maintaining and generating the code of safety-related user programs are known today to run as a closed application on a device.

BACKGROUND

In this context, EP 0 997 807 A2, for example, discloses a method for online updating safety-critical software in railway signaling technology, in particular, for introducing production software into certain target computers. For this purpose, each participant in the processing chain receives a public and secret key. In addition, a certifying entity is determined, which confirms with a certificate the affiliation of the keys to the participants. When creating and testing the safety-critical software in successive steps of the processing chain, a respective participant then receives in each case as a default the software and the signatures and key certificates of the predecessors generated with the secret key.

Furthermore, EP 2 363 770 B1, for example, discloses a safety device including a configuration unit and a safety control system configurable therewith. In this case, the configuration unit generates a numerical code that represents logic rules, on the basis of which a controller signal is generated by a control program of the safety control system as a function of input signals.

A method is known from DE 10 2015 209 108 A1 for authorizing a function of an embedded target control device, wherein a decision gateway requests a function request intended for the target control device from a hardware security module and then receives the former from the hardware security module. The function request is having been previously signed by the hardware security module. The latter also sends the received function request via a communication channel supported by a cryptographic identity of the decision gateway to a backend and then receives from the backend a ticket corresponding to the function request signed by the backend and stores same. Following a request by the target control device to release the function, the function is released accordingly if the ticket is valid, after which the ticket is devaluated.

It is an object of the present invention to demonstrate a technical way in which the development also of more complex control logic and accordingly the processing of application programs, including generating a corresponding safety-related machine code also may take place on different devices and may nevertheless be clearly tracked.

The technical solution according to the invention is provided by a method according to Claim 1. Preferred further developments are the subject matter of the dependent claims.

To process a safety-related user program for a safety control system, which is configured to control at least one automated device that contains a least one protection unit for carrying out at least one safety function. The user program specifies logical connections as a function of a respective state of the at least one safety function for the safety control system for controlling the machine via the safety control system. The invention therefore proposes as a technical solution a method, in which data for a user program are successively generated on a plurality of remote device environments distributed spaced apart from one another, each of which provides a safety-related user program processing tool for generating data, and which is further characterized by the following steps. On each one of the device environments, data for the user program are generated via the safety-related user program processing tool provided in each case by said device environment and, once the data have been generated, these generated data for the user program are transferred in each case to one of the other of these device environments.

Prior to a respective transfer of generated data, one signature each is generated based at least on the entirety of the generated data by the signature unit of the device environment in which the data for the user program to be transferred have been generated, and the generated signal together with the generated data is transferred.

Following a respective transfer of generated data together with a generated signature, a check of the received signature on the device environment receiving these data and signature is performed by a signature unit of this receiving device environment. If the result of the signature check is error-free, data are regenerated for the user program based on the received data, and the signature to then be transferred together with these newly generated data is generated by the signature unit of the user program processing tool based at least on the entirety of the data generated on this device environment and based on the respectively received signature.

Thus, an important advantage is that each step in the processing of a safety-related user program, i.e., any generation of data for the user program may be automatically documented and may be clearly tracked at any time, without requiring a self-contained application for such purpose on a shared device. Corruptions of a processing step may accordingly also be automatically detected on other devices and also on different devices.

The technical solution according to the invention is also reflected in an automation system by a method according to Claim 13.

For an automation system designed for carrying out the method according to the invention, the invention further provides that this automation system comprises a plurality of remote device environments distributed spaced apart from one another, each of which provides a safety-related user program processing tool for generating data for a user program for a safety control system. The user program processing tool further comprises a signature unit for generating a signature and for checking signatures. In this case, a first device environment of this plurality of different remote device environments distributed spaced apart from one another is expediently configured on a communication user terminal equipment. Such terminal equipment can include, in particular, a mobile communication user terminal equipment, a second device environment is configured on a cloud computer, and at least one additional device environment of this plurality of remote device environments distributed spaced apart from one another is also configured.

The first device environment, the second device environment and the at least one additional device environment also have interfaces and are designed to transfer respectively generated data together with a respectively generated signature from the first device environment to the second device environment, from the second device environment to the at least one additional device environment and particularly preferably also from the at least one additional device environment to the second device environment.

The first device environment in this case expediently provides as a user program processing tool a safety-related programming tool for generating a source code of the user program, as well as a signature unit interacting with the programming tool for generating a signature based at least on the entirety of the generated source code. The second device environment expediently provides as a user program processing tool a compiler tool for generating a machine code of the user program, and particularly preferably also a safety-related tool for generating start-up data and/or test procedure data for the user program. The second device environment also provides a signature unit interacting with the tools for checking a respectively instantaneously received signature and for generating a signature based at least on the entirety of data generated on the second device environment and on the last respectively checked signature.

The processing of a safety-related user program of a safety control system, i.e., in particular, the creation, start-up and maintenance of safety-related user programs may accordingly be started preferably on mobile communication user terminal equipment, for example, phone, tablet, notebook or PC with corresponding editors. The tools for creating the machine code as well as the start-up data and/or test procedure data for the safety-related user program of the safety control system on the other hand are stored on a cloud computer. Thus, the generation of the machine code as well as of the start-up data and/or test procedure data takes place within the scope of the invention remotely and separately from the mobile terminal on a cloud computer of the type which accordingly combines the individual or application-related tools and services necessary therefor with the correspondingly configured device environment in a system that is accessible via a computer network, particularly preferably also accessible via the Internet, but is centrally operable.

The identification between the individual device environments, such as phone, tablet, cloud computer, etc., and the safety control system is nevertheless unique as a result of the respective signal generation, signal transfer and signal check according to the invention. The data required for generating the machine code and, therefore, the source data for the user program, expediently including any integrated object data, parameterization data and/or library data and/or library files are secured with a unique signature and transmitted to the cloud computer.

BRIEF DESCRIPTION OF THE DRAWINGS

Further features and advantages of the invention result from the following description of preferred embodiments with reference to the appended drawings.

FIG. 1 is a highly schematized representation of an embodiment of an automation system within the scope of the invention, FIG. 2 is a highly schematized sequence of an embodiment of a method within the scope of the invention, and FIG. 3 is a highly schematized sequence of a further embodiment of a method within the scope of the invention.

DETAILED DESCRIPTION

Preferred embodiments of the method according to the invention for processing a safety-related user program for a safety control system not shown in greater detail in the drawings for reasons of clarity, as well as an automation system expediently configured for such purpose for carrying out the method are described below in greater detail with reference to the drawings. The safety control system in this case is configured to control an automated device, which contains at least one protection unit for carrying out at least one safety function likewise not depicted in further detail in the figures for reasons of clarity.

The user program specifies logical connections as a function of a respective state of the at least one safety function for the safety control system for controlling the machine via the safety control system. Such safety control systems and the applications thereof are known per se to the person skilled in the art and are therefore not described in detail here. For example, a machine, for example, a punch machine including a protection unit integrating the safety functions of an emergency stop and of a light barrier, may be cited as an automated device including at least one protection device for the application of such a safety control system. The protection unit is thus used by the machine manufacturer for mitigating risk on the part of the user, i.e., in order to prevent or to avoid dangers to humans and/or to the environment on the part of the user, and thus in the above example in order, in particular, to prevent dangers to the personnel maintaining the machine with a protection unit made up of an emergency stop and a light barrier.

The drive of this machine may thus be activated only if both safety functions, i.e., the emergency stop and the light barrier signal a safe state to the protection unit. The monitoring of this protection unit is carried out by a safety-related control system, i.e., within the scope of the terminology of the present description and claims, by a safety control system which activates or also deactivates the drive in accordance with the monitoring result and thus also controls the machine as a whole, for example, also moves it into a safe state. For this purpose, a programmer, using a suitable software, customarily creates a safety-related user program for the safety control system, by means of which the logical connections are specified as a function of a respective state of the at least one safety function for the safety control system for controlling the automated device via the safety control system. Examples of automated devices are identified in FIGS. 2 and 3 by M1, M2, M3, and M4. The safety control system in this case may be in the automated device or may control the latter externally.

FIG. 1 shows a highly schematized representation of an embodiment of an automation system with which, in contrast to the conventional creation of such a safety-related user program, it is possible to carry out an embodiment of a method within the scope of the invention, as depicted, for example, in FIG. 2 or FIG. 3. The. Accordingly, each device in this case is integrated into or provides its own device environment. In other words, a plurality of device environments involved in the processing of a respective application program within the scope of the invention are included. For example, the device environments E1, E2, E3a and E4 according to FIG. 1, each provide a safety-related user program processing tool T1, T2, T3a and T4 for generating data for a user program for a safety control system, and are accordingly remotely distributed spaced apart from one another and, therefore, configured on different devices.

The data required in each case for a user program, i.e., in particular, starting with the creation of a source code from the compilation all the way to the data necessary for start-up and maintenance are therefore generated successively on such remote device environments distributed spaced apart from one another and subsequently transferred together with a signature to one other of these device environments.

A first device environment E1 is further expediently configured on a communication user terminal equipment, in particular, on a PC, a notebook or a mobile device such as, for example, a tablet or smartphone. The first device environment E1, as a user program processing tool T1, preferably has a safety-related programming tool configured to create a source code of the user program, as well as a signature unit interacting with the programming tool for generating a signature based at least on the entirety of the generated source code.

The first device environment E1 is preferably configured on a mobile communication user terminal equipment, so that a programmer starting or initiating the processing of a user program may in this case operate preferably at any location.

A second device environment of this plurality of remote device environments distributed spaced apart from one another identified by the reference numeral E2, is configured preferably on a cloud computer. In addition to providing computing services known per se such as, for example, server, memory, databases, network components, software, analytical or intelligent functions, etc., via a computer network ("the cloud"). The computer network can be for example, a company network or the Internet, such a device environment may accordingly expediently combine the individual or application-related tools and services in a system that is accessible via the computer network, particularly preferably also via the Internet, but is centrally operable.

As indicated in FIG. 1, the first device environment E1 and the second device environment E2 are furnished with interfaces Il, 12 and are configured to transfer the data generated in each case on first device environment E1, together with a signature generated there, from the first device environment E1 to the second device environment E2.

The second device environment E2, which is accordingly configured to receive this data generated on the first device environment E1, i.e., in particular the source code, expediently including any integrated object data. The other received data can include parameterization data and/or library data and/or library files, and a generated signature, and also expediently has as a user program processing tool T2 a safety-related compiler tool for generating a machine code of the user program. The user program processing tool T2 of the second device environment E2 further comprises preferably also a safety-related tool for generating start-up data and/or test procedure data for the user program, as explained in greater detail below. In addition, the second device environment E2, expediently as part of the user program processing tool T2, has a signature unit interacting with the tools for checking a respectively instantaneously received signature. The signature unit can also be used for generating a signature based at least on the entirety of data generated on the second device environment E2 and on the last respectively checked signature.

The automation system within the scope of the invention further has at least one additional configured device environment. FIG. 1 shows five additional device environments E3a, E3b, E3c, E3d and E4, which are furnished with interfaces I3a, I3b, I3c, I3d and I4. Accordingly, a plurality of additional configured device environments is provided. This at least one additional device environment E3a, E3b, E3c, E3d and E4 and the second device environment E2 are further expediently configured to transfer respectively generated data together with a respectively generated signature from the second device environment to the at least one additional device environment. The respectively generated data and generated signature can also be transferred also from the at least one additional device environment to the second device environment.

At least one of these additional device environments, in FIG. 1, for example, the four additional device environments E3a, E3b, E3c and E3d, are expediently configured in this case on an automated device. Moreover, the four additional device environments E3a, E3b, E3c, and E3d are configured for the controlling of which the safety-related user program of the safety control system is processed. In this case, therefore, start-up data generated preferably also on the device environment E2 are transferred to such an additional device environment.

In addition or alternatively, however, one of these additional device environments, in FIG. 1, for example, the additional device environment E4, may also be configured on a device providing a test environment. In this case, therefore, test procedure data generated on the device environment E2 is also transferred to such an additional device environment.

As previously noted, FIG. 2 or FIG. 3 shows in each case a highly schematized sequence of a preferred embodiment of the processing according to the invention of a safety-related user program using such an automation system. In this case, respective data for the user program are accordingly generated on a respective device environment of the device environments via the safety-related user program processing tool provided in each case by this device environment. Further, a signature is generated based on the entirety of these generated data. These generated data are subsequently transferred together with the signature to another of these device environments.

According to FIGS. 2 and 3, the data identified by proj.data are generated on device environment E1, for example, and based at least on these data, i.e., in particular, the source code. Other data can include any integrated object data, parameterization data and/or library data and/or library files, generated with signature identified by Sig1. The data identified by proj.data, i.e., in particular, the source code data, expediently including any integrated object data, parameterization data and/or library data and/or library files, are transferred together with the signature identified by Sig1 to the device environment E2, as is indicated with the arrow identified by the reference numeral 1.

After the transfer of such generated data together with the signature, the received signature is initially checked on the device environment receiving the data and signature by a signature unit of this device environment. If the result of the signature check is error-free, data for the user program is regenerated on this device environment based on the received data. A signature to then be transferred together with these newly generated data is further generated by the signature unit of this device environment based at least on the entirety of the data generated on this device environment and on the respectively received signature.

According to FIGS. 2 and 3, for example, the data identified by comp.data are regenerated on the device environment E2 after the error-free check of the signature identified by Sig.1, specifically, based at least on the received data identified by proj.data. The data identified by comp.data generated on the device environment E2 is expediently also stored there. Furthermore, the signature identified by Sig2 is then generated on the basis of the regenerated data identified by comp.data and of the signature identified by Sig1 received.

Such regenerated data together with the signature generated therefore may accordingly be transferred within the scope to another device environment following in the sequence of the processing of the data. In the alternative, the regenerated data and generated signature depending on the processing sequence and processing steps encompassed by the processing, can be transferred to a device environment on which regenerated data are no longer generated.

However, data for the user program are preferably generated, at least until the conclusion of a complete intended start-up of the user program, successively on remote device environments distributed spaced apart from one another, as is apparent below.

As may be seen in FIGS. 2 and 3, metadata identified in the figures by MetaData are further also transferred in a preferred further development in each case during the respective transfer of the generated data and signature. These may relate, in particular, to the respective device environment on which the generated data has been generated, and/or to the date of the data generation and/or to a user of a user program processing tool generating the data. SmartContract data, identified in the figure with SmartContract, in particular, relating to the device environment to which the generated data is transferred, may also be transferred, as apparent from the embodiment according to FIG. 3. SmartContracts, as is known per se, are based on computer protocols, in particular, utilizing a block chain technology, and enable automatic contracts which enter into force in certain events without the need for human monitoring. Accordingly, within the scope of the invention, a predetermined further action may be automatically triggered using SmartContracts when a particular event occurs, in particular on the device environment receiving the transferred data.

Taking the above explanations relating to FIGS. 1, 2 and 3 into consideration, source data for the user program are accordingly generated preferably on the device environment E1 as data identified by proj.data according to FIGS. 2 and 3, and machine code data for the user program is generated on the device environment E2 as data identified by comp.data.

The embodiments shown in FIGS. 2 and 3 thus represent, in particular, an exemplary embodiment, in which the safety-related user program is developed as part of a particular project, initially by means of a programming tool, i.e., expediently by means of a program editor, and a source code for this safety-related user program is generated. The device environment E1 has this programming tool specially designed as a user program processing tool (T1, FIG. 1) and is preferably configured as or on a communication user terminal equipment. The user terminal equipment can be, for example, in the manner of a PC, notebook or mobile device such as, for example, a tablet or smartphone. Once the data identified by proj.data, i.e., specifically the source code data, has been generated for this safety-related user program within the scope of a particular project, the data, (expediently including any integrated object data, parameterization data, and/or library data and/or library files) is transferred to at least one compiler as a compiler tool of the user program processing tool (T2, FIG. 1) of the device environment E2, cf. reference numeral 1, the device environment E2 being configured in this exemplary embodiment on a cloud computer.

The transfer expediently occurs in the form of a file that contains all the data. However, further metadata such as, for example, the name of the processor who made the last change, is preferably also transferred, the aforementioned file expediently containing the metadata as well. Alternatively, or in addition to the metadata, SmartContract data generated in particular in the form of a program, which contain the condition(s) for an automatic further processing is transferred in a particularly preferred further development (FIG. 3) via the user program processing tool (T1, FIG. 1), the aforementioned file expediently containing these SmartContract data as well. The source code data generated on the device environment E1, in particular, is expediently further secured in this case against any type of corruption in conjunction with the transfer. A signature Sig.1 is subsequently also generated based on the entirety of the data generated on the device environment E1. A unique signature is expediently calculated for this purpose over the entirety of the data generated on the device environment E1. The signature Sig.1 is appended to the generated data and transferred together with the latter, cf. reference numeral 1, preferably likewise within the aforementioned file.

The compiler or compilers run on the cloud computer with the device environment E2. This/these compiler(s) check(s) the received signature Sig.1 before the further processing of the safety-related user program and, after a successful check, generate(s) the data identified in FIGS. 2 and 3 with comp.data, in particular, from the source code data contained in the received file. Moreover, the source code data, could be, i.e., machine code for the safety control system executable according to the exemplary embodiment. If the compilation process is successfully completed, a signature may already be regenerated in the simplest embodiment within the scope of the invention based on these generated data. In particular, a signature may be recalculated via the machine code, wherein in this case the previously received signature Sig.1 is also included and the newly generated signature, at least together with the machine code, is transmitted to an additional device environment of this plurality of remote device environments distributed spaced apart from one another. This additional device environment may be configured, for example, on an automated device to be controlled.

Start-up data for the user program at least, in addition to the machine code data, is expediently also generated via the user program processing tool (T2, FIG. 1) of the device environment E2. In particular, depending on the application-specifically, the start-up data and machine code data are potentially also transferred and therefore received SmartContract data. In addition, the machine code data and start-up data are transferred as generated data to the at least one additional device environment for starting up the user program. In this case, the renewed generation of the signature also to be transferred accordingly takes place as generated data at least based further on the start-up data. It should be noted, however, that in a variation, such start-up data for the user program may also be generated on another device environment not depicted in the figures for reasons of clarity. The other device environment then transfers the start-up data as generated data, together with a corresponding newly generated signature and the machine code data, to the at least one additional device environment for starting up the user program.

In a particularly preferred embodiment, however, as also in the exemplary embodiments according to FIGS. 2 and 3, test procedure data, identified in the FIGS. 2 and 3 by testdata, for the user program is generated in addition to the machine code data via the user program processing tool (T2, FIG. 1) of the device environment E2, i.e., in particular upon successful completion of the compilation process. The machine code data and test procedure data are transferred as generated data initially to an additional device environment E4 of the plurality of remote device environments distributed spaced apart from one another for testing the user program. In this case, the regeneration of the signature Sig.2 also to be transferred accordingly takes place as generated data at least further based on the test procedure data. It should be noted, however, that in a variation such test procedure data for the user program may also be generated on another device environment not depicted in the figures for reasons of clarity, which obtains initially merely the machine code together with the signature newly generated for this purpose from the device environment E2. Further, this other device environment then transfers the test procedure data as generated data, together with a corresponding newly generated signature and the machine code data, to the at least one additional device environment E4 for testing the user program.

After the machine code data and test procedure data have been received and if the result of the check of the received signature Sig.2 is error-free, a test procedure is then completed and test result data identified in the FIGS. 2 and 3 by testrec.data for the user program is generated on the additional device environment E4. The test result data is then transferred in a particularly preferred embodiment as generated data back again to the device environment E2. The generated data testrec.data is accordingly provided as a basis and the previously received signature Sig.2 is also included in the generation for the signature Sig.3 also to be transferred. It should be noted, however, that instead of the device environment E2, in a variation the test result data may also be transferred to another device environment not depicted in the figures for reasons of clarity.

If, therefore, returning to the exemplary embodiment previously described with reference to the embodiments shown in FIGS. 2 and 3, the compilation process for generating the data identified by comp.data in the FIGS. 2 and 3 from the source data contained in the received data is successfully completed on the device environment E2. In addition, in the case of additionally transferred SmartContract data (FIG. 3), a particular event has occurred, test procedure data testdata is generated for individual test cases for the safety-related user program on the device environment E2. The new signature Sig.2 is subsequently calculated via the machine code comp.data, and the test procedure data testdata. In addition, expediently via further metadata such as, for example, pieces of information relating to the compiler(s), the signature Sig.1 from the previous processing step and/or, expediently via further conditions for the automatic further processing in the form of SmartContract data are also noted. One condition included in the SmartContract data may, for example, be that after the successful carrying out of all test cases, the results are transmitted in a specified manner automatically to the device environment E2, i.e., according to the exemplary embodiment, back to the cloud computer. The data just cited are in turn expediently passed further in the form of a file to a test environment, i.e., according to FIGS. 2 and 3, to the additional device environment E4, cf. reference numeral 2.

Once the test has been successfully carried out and corresponding test result data, testrec.data have been generated, a condition like the aforementioned is met. Accordingly, the results are expediently transmitted automatically back to the device environment E2. The signature Sig.3 is also to be transmitted and is recalculated and thus generated via the test procedure data testdata containing the test results, and the signature Sig.2 from the preceding operating step of the device environment E2. Further, it can also include, optionally, via further metadata such as, for example, pieces of information relating to the test environment, and/or SmartContract data. Thus, the aforementioned data, together with the signature Sig.3 are, in turn, expediently transmitted to the cloud computer in the form of a file, cf. reference numeral 3.

Once the test results of the successfully implemented test are available on the cloud computer, i.e., in general, on the device environment E2, the signature Sig.3 received is initially checked there again. If the result of this signature check is error-free, start-up data for the user program is subsequently generated according to the preferred embodiment depicted, as previously already described. The cloud computer, i.e., in general, the device environment E2 in a particularly preferred further development then accordingly provides first the start-up data, identified in FIGS. 2 and 3 by startdata as generated data together with the previously generated machine code data comp.data, for example, in the form of a start-up file. The device environment then transfers these to the additional or also third device environment E3a already described above, for starting up the user program. The machine code data, as previously stated, has been expediently stored on the device environment E2. Together with the generated data, in particular, also within such a file, a signature Sig.4 is transferred again, which again is generated on the basis of all data as previously described and of the received signature. Such data can include, i.e., in particular, via the machine code, the start-up data, preferably also via additional metadata such as, for example, who generated the startup data and/or additional SmartContract data such as, for example, that for a release a complete validation of the wiring must have taken place, and is calculated via the received signature from step 3. Together with the signature Sig.4, this file is then transmitted for startup on device environment E3a, which is configured on an automated device to be controlled, cf. reference numeral 4.

A start-up procedure is completed on the device environment E3a of the plurality of remote device environments distributed spaced apart from one another after the machine code data and start-up data have been received. Further, if a result of the check of the signature Sig. 4 is error-free, and when the start-up is fully completed, start-up validation data, identified in FIGS. 2 and 3 by com.data, are expediently generated for the user program.

A file including the validation result is generated. The start-up validation data contained, in particular, again in a file, are supplemented by a new signature Sig.5. This signature is generated in a manner corresponding to the preceding processing steps and is accordingly calculated, in particular, via the previously received signature Sig. 4 of the preceding processing step, via the results. The results include, i.e., the start-up validation data and, expediently via additional metadata such as, for example, who carried out the validation and/or additional SmartContract data. The start-up validation data is subsequently transmitted, again extremely expediently as generated data back to the device environment E2. Moreover, the device environment E2, i.e., in the specific exemplary embodiment, also can refer to the cloud computer, together with the additional data optionally contained in the file as well as the signature Sig.5, in particular, for concluding the complete intended start-up of the user program, cf. reference numeral 5. It should be noted, however, that instead of the device environment Eta, in a variation the start-up validation data may also be transmitted to another device environment not depicted in the figures for reasons of clarity.

If the step of the start-up and validation is completed, the safety-related user program is then considered to be certified. For this purpose, certification data, identified by a machine certificate in FIGS. 2 and 3, is generated for the user program according to the preferred embodiment depicted on the device environment E2. The certification data is generated if a result of the check of the signature Sig.5 is error-free, and is expediently stored on the device environment E2, in particular, in a certificate for device environments that are configured on an automated device to be controlled which contains the at least one protection unit for executing at least one safety function.

Furthermore, a new signature Sig.6 is generated, i.e., a new signature Sig.6 is calculated, in particular, via the certification data as generated data, via the previously generated machine code and expediently additional metadata and/or SmartContract data, as well as the signature Sig.5 received from the preceding processing step. This newly generated signature Sig.6 is expediently likewise entered into the aforementioned certificate, which is located preferably on the cloud computer, i.e., in general on the device environment E2. The aforementioned data, together with the newly generated signature Sig.6 may subsequently be transmitted in an automated manner to multiple device environments E3b, E3c and/or E3d, in addition or alternatively also, however, to E3a. The multiple device environments E3a, E3b, E3c, and E3d are configured on an automated device to be controlled that contains the at least one protection unit for executing at least one safety function, cf. reference numeral 6. As previously described, such automated devices are marked in the FIGS. 2 and 3 by M1, M2, M3 and M4.

The user program may then be executed as intended on the device environments E3b, E3c, E3d and/or on E3a after the certification data and machine code data have been received, and if a result of the signature check is error-free. To check the signature Sig.6, it is provided in a preferred further development, in particular, that on the device environments E3b, E3c, E3d and/or E3a and thus, in particular, on the automated device, an online verification is carried out and it is checked whether the signature Sig.6 of the received file has been entered into the corresponding machine certificate on the device environment E2. If the result of the check is positive, the machine code is then executed. It should be noted, however, that instead of the device environment E2, the certificate may, in principle, also be stored on another device environment not depicted in the figures for reasons of clarity.

In consideration of the preceding description, it can be seen that the generation of start-up data and/or test procedure data neither mandatorily has to take place nor, if such start-up data and/or test procedure data are generated, does it mandatorily have to take place on the device environment E2. Accordingly, it is also not mandatory that once the test procedure and/or start-up is/are executed, newly generated data based thereon must be transferred back again to the device environment E2. Thus, in addition to the device environment E2, additional or other device environments or entities may be comprised within the scope of the invention, on which the respective processing steps, carried out in each case according to the previous description in a preferred embodiment on the device environment E2, are carried out.

To the extent it must be resorted also to the machine code data, it is then accordingly to be transmitted in a correspondingly signed manner as previously described also to the additional or other device environment provided for the corresponding processing step. In consideration of the preceding description, the present invention accordingly also relates further within the scope of the processing of a safety-related user program for a safety control system. Moreover, in a particularly preferred embodiment, in particular to the creation, start-up and maintenance of safety-related user programs of a control device for automation machines by means of mobile terminals such as, for example, smartphone, tablet notebook or PC, for which purpose the editors run on the respective mobile terminal, whereas the compilers for generating the machine code run on a remote cloud computer. Thus, the generation of the machine code for the safety-related control in this case takes place on a cloud computer. The identification between the mobile terminal and the accordingly in particular safety-related control device is unique and the data required for generating the machine such as, for example, source code data of the user program, are secured with a unique signature and transmitted to the cloud computer.

The machine code is generated on the cloud computer from the transmitted data. A new signature is generated via the resulting data and the signature from the preceding step. If the machine code is successfully generated, the generated machine code including the signature and possible metadata may be automatically or manually forwarded to a test environment. This automatism is specified in the signature preferably in the form of a so-called Smart Contract. When using Smart Contracts, the code of the Smart Contract is also secured via the signature. In a test environment, test cases for checking the safety-related user program may then be carried out. If the tests are successfully carried out, a signature in which the signature of the preceding step is also integrated is again calculated via the test data and via the potentially present metadata. Here, too, it is preferably specified via the Smart Contracts that only after a successful test are the data including the newly calculated signature transmitted in an expedient manner again to the cloud computer or, in principle, also to another entity. If the test was successful, a new signature is again calculated via the machine code including potentially additional start-up data and the signature of the preceding step and transmitted to a machine for a start-up.

It is also specified that an automatic release of the program occurs only after successful start-up. If the start-up is successfully completed, a signature is again calculated via the machine code including potential additional data such as, for example, certification data, as well as the signature from the preceding step, and the data is distributed onto the machines. With the aid of the signature, which has been expediently also transmitted to the machine, the entire safety life cycle, also referred to as safety life cycle, may be tracked and an online verification may be further compared against a machine certificate expediently stored on the cloud computer or, in principle, also on another entity. Thus, it is ensured that the safety-related user program has completed all steps of the safety life cycle, and the program is certified.

The entire safety life cycle, including the simulation of the application, start-up and distribution onto the machines is, in particular, also covered, since each step in the life cycle is automatically documented and may be clearly tracked at any time, and corruptions of a step may be detected.

The invention claimed is:

1. A method for processing a safety-related user program for a safety control system, which is configured to control at least one automated device, which contains at least one protection device for carrying out at least one safety function, wherein the safetly-related user program specifies logical connections as a function of a respective state of the at least one safety function for the safety control system for controlling the at least one automated device via the safety control system, by the steps of:

generating data for a safety-related user program successively on a plurality of remote device environments distributed spaced apart from one another, each of which provides a safety-related user program processing tool, wherein the data for the safety-related user program is generated on a respective device environment of the plurality of remote device environments via the safety-related user program processing tool provided in each case by this device environment and, after the data is generated, the generated data together with a signature are transferred to another one of these remote device environments;

wherein prior to transfer of the generated data together with the signature, the signature is generated based at least on the entirety of the generated data by a signature unit of the device environment on which the data for the safety-related user program has been generated; and wherein after the transfer of the generated data together with the signature, on the device environment receiving the data and signature, receiving the data and signature wherein the received signature is checked by a signature unit of this device environment, and if a result of the signature check is error-free; and wherein data for the safety-related user program is regenerated based on the received data, and the signature to be transferred together with this regenerated data based at least on the entirety of the data generated on this device environment and on the respectively received signature generated by the signature unit of this device environment.

2. The method according to claim 1, wherein the data for the safety-related user program is generated successively on the plurality of remote device environments distributed spaced apart from one another until a completion of a complete intended start-up of the safety-related user program.

3. The method according to claim 1, wherein with each transfer of the generated data together with the signature, metadata relating to the device environment on which the generated dathas been generated, relating to the date of the data generation and/or relating to a user of the safety-related user program processing tool generating the data, and/or smart contract data relating to the device environment to which the generated data is transferred, are also transferred.

4. The method according to claim 1, wherein source code data for the safety-related user program is generated on a first device environment of the plurality of remote device environments distributed spaced apart from one another and transferred from the first device environment as the generated data to a second device environment of the plurality of remote device environments;

machine code data for the safety-related user program is generated on the second device environment of the plurality of remote device environments after receipt of the source code data and if a result of the signature check is error-free, and said machine code data is transferred as generated data to at least a third device environment of the plurality of remote device environments.

5. The method according to claim 4, wherein in addition to the machine code data, start-up data for the safety-related user program is generated on the second device environment of the plurality of remote device environments distributed spaced apart from one another after receipt of the source code data, and the machine code data and start-up data are transferred as generated data to at least the third device environment of the plurality of remote device environments distributed spaced apart from one another for starting-up the safety-related user program.

6. The method according to claim 4, wherein in addition to the machine code data, test procedure data for the safety-related user program is generated on the second device environment of the plurality of remote device environments distributed spaced apart from one another, and the machine code data and test procedure data are transferred as generated data to a fourth device environment of the plurality of remote device environments distributed spaced apart from one another for testing the safety-related user program, wherein a test procedure is completed and test result data for the safety-related user program is generated on the fourth device environment of the plurality of remote device environments distributed spaced apart from one another after receipt of the machine code data and test procedure data and if a result of the signature test is error-free, wherein the test result data is transferred as generated data to the second device environment of the plurality of remote device environments distributed spaced apart from one another.

7. The method according to claim 6, wherein start-up data for the safety-related user program is generated on the second device environment of the plurality of remote device environments distributed spaced apart from one another after receipt of the test result data and if a result of the signature check is error-free, and the start-up data is transferred as generated data together with the previously generated machine code data to the third device environment of the plurality of remote device environments distributed spaced apart from one another for starting up the safety-related user program.

8. The method according to claim 5 wherein a start-up procedure is completed and start-up validation data for the safety-related user program is generated on the third device environment of the plurality of remote device environments distributed spaced apart from one another after receipt of the machine code data and start-up data and if a result of the signature check is error-free, and wherein the start-up validation data is transferred as generated data to the second device environment of the plurality of remote device environments distributed spaced apart from one another for concluding the complete intended start-up of the safety-related user program.

9. The method according to claim 8, wherein
certification data for the safety-related user program is generated on the second device environment of the plurality of remote device environments distributed spaced apart from one another after receipt of the start-up validation data and if the result of the signature check is error-free.

10. The method according to claim 9, wherein the generated certification data is stored on the second device environment of the plurality of remote device environments distributed spaced apart from one another.

11. The method according to claim 9, wherein
the certification data is transferred as generated data together with the previously generated machine code data to a number of third device environments of the plurality of remote device environments distributed spaced apart from one another.

12. The method according to claim 11, wherein
the safety-related user program is executed as intended on the number of third device environments of the plurality of remote device environments distributed spaced apart from one another after receipt of the certification data and machine code data and if the result of the signature check is error-free.

13. An automation system for carrying out the method according to claim 1, comprising:
a plurality of remote device environments distributed spaced apart from one another, each of which provides a safety-related user program processing tool for generating data for the user program for a safety control system, wherein the safety-related user program processing tool further comprises a signature unit, wherein
a first device environment of this plurality of remote device environments distributed spaced apart from one another is configured on a communication user terminal equipment,
a second device environment of the plurality of remote device environments distributed spaced apart from one another configured on a cloud computer, and at least one additional device environment of the plurality of remote device environments distributed spaced apart from one another is configured, wherein
the first device environment, the second device environment and the at least one additional device environment have interfaces and are designed to transfer in each case generated data together with a respectively generated signature from the first device environment to the second device environment, for the second device environment to the at least one additional device environment and from the at least one additional device environment to the second device environment.

14. A system comprising:
a first device environment among a plurality of remote device environments, wherein the first device environment is configured to generate source code data for a user program and transfer the generated source code data to a second device environment among the plurality of remote device environments;
the second device environment among the plurality of remote device environments, configured to receive the generated source code data from the first device environment and generate machine code data for the user program, wherein the machine code data is generated based on receipt of the generated source code data from the first device environment and if a result of a signature check is error-free; and
a third device environment among the plurality of remote device environments,
wherein the third device environment is configured to receive the machine code data if the second device environment receives the source code data and if the result of the signature check is error-free.

15. The system of claim 14, wherein the second device environment is configured to generate certification data for the user program if the result of the signature check is error-free.

16. The system of claim 14, wherein the second device environment is configured to generate start-up data and transfer the start-up data to the third device environment.

17. The system of claim 14, wherein the second device environment transmits generated certification data with the generated machine code data to the third device environment.

18. The system of claim 14, wherein the third device environment is configured to generate start-up validation data for the user program.

19. The system of claim 18, wherein the third device environment transfers the generated start-up validation data to the second device environment.

20. The system of claim 14, further comprising:
a fourth device environment among the plurality of device environments, wherein the fourth device environment is configured to generate test result data for the user program.

21. The automation system according to claim 13, wherein
the first device environment provides a safety-related programming tool for generating a source code of the safety-related user program as a safety-related user program processing tool as well as a signature unit interacting with the safety-related programming tool for generating a signature based on the entirety of the generated source code; wherein
the second device environment provides a safety-related compilation tool for generating machine code of the safety-related user program as well as a safety-related tool for generating start-up data and/or test procedure data for the safety-related user program as a safety-related user program processing tool, and a signature unit interacting with the safety-related tool for checking a respectively currently received signature and for generating a signature based on data generated on the second device environment and on a last respectively checked signature.

* * * * *